United States Patent [19]

Hyatt et al.

[11] Patent Number: 5,485,590
[45] Date of Patent: Jan. 16, 1996

[54] PROGRAMMABLE CONTROLLER COMMUNICATION INTERFACE MODULE WHICH IS CONFIGURABLE BY A REMOVABLE MEMORY CARTRIDGE

[75] Inventors: Craig S. Hyatt, Pewaukee; Gary A. Turek, Menomonee Falls; Richard J. Molus, Sr., Greenfield; Emmanuel G. D. Hostria, Mukwonago, all of Wis.

[73] Assignee: Allen-Bradley Company, Inc., Milwaukee, Wis.

[21] Appl. No.: 461,865

[22] Filed: Jan. 8, 1990

[51] Int. Cl.[6] .................................................. G06F 13/00
[52] U.S. Cl. .................. 395/442; 395/800; 395/833; 364/238.4; 364/236.6; 364/239.5; 364/239.51; 364/DIG. 2; 364/926.92; 364/191
[58] Field of Search ................................. 395/325, 275, 395/700, 425

[56] References Cited

U.S. PATENT DOCUMENTS

| | | | |
|---|---|---|---|
| 4,254,473 | 3/1981 | Galdun et al. | 395/275 |
| 4,441,164 | 4/1984 | Pavan et al. | 395/115 |
| 4,506,346 | 3/1985 | Bennett et al. | 395/325 |
| 4,648,068 | 3/1987 | Ninnemann et al. | 395/325 |
| 4,680,731 | 7/1987 | Izumi et al. | 365/52 |
| 4,703,416 | 10/1987 | Crupi et al. | 395/325 |
| 4,725,977 | 2/1988 | Izumi et al. | 395/425 |
| 4,751,634 | 6/1988 | Burrus, Jr. et al. | 395/275 |
| 4,787,028 | 11/1988 | Finfrock et al. | 395/325 |
| 4,809,217 | 2/1989 | Floro et al. | 395/275 |
| 4,872,136 | 10/1989 | Cieri et al. | 395/275 |
| 4,984,193 | 1/1991 | Nakagawa | 395/425 |

*Primary Examiner*—Krisna Lim
*Attorney, Agent, or Firm*—John J. Horn; George A. Montanye

[57] ABSTRACT

A module interfaces a programmable controller to several serial communication networks over which data may be exchanged according to different protocols. A module has a central controller and a separate port circuit for each of the networks. Each port circuit includes a microprocessor and a shared memory to which both the central controller and the port microprocessor have access for the exchange of data. The central controller transfers data from the shared memories to a module output coupled to other components of the programmable controller. A removable memory cartridge stores a plurality of programs for execution by the port microprocessors to exchange data over the networks using different communication protocols. Configuration data is stored in the module defining which program is to be transferred from the memory cartridge into the shared memory of each port circuit. Protocol parameter configuration inquiries are stored for each program so that the user can be queried to select values for the parameters of the communication protocol used by the program.

20 Claims, 7 Drawing Sheets

SYSTEM MEMORY MAP

PROGRAMMABLE CONTROLLER COMMUNICATION INTERFACE MODULE WHICH IS CONFIGURABLE BY A REMOVABLE MEMORY CARTRIDGE

BACKGROUND OF THE INVENTION

The present invention relates to programmable controllers which are employed to control the operation of one or more pieces of manufacturing equipment, and more particularly to modules which interface the programmable controller to external devices using a serial communication link.

Programmable controllers, such as the one described in U.S. Pat. No. 4,858,101, typically are connected to industrial equipment, such as assembly lines and machine tools, to sequentially operate the equipment in accordance with a stored control program. The control program comprises instructions which are read out in rapid sequence and executed to examine the condition of selected sensing devices on the controlled equipment, or to energize or deenergize selected operating devices on the controlled equipment contingent upon the status of one or more of the examined sensing devices.

Many types of sensing devices have been devised for detecting various conditions on the controlled equipment and providing an input signal to the programmable controller. The simplest of these types of devices are switches which provide a DC or an AC signal to the programmable controller. Other devices, such as temperature or pressure sensors provide a four to twenty milliampere signal having a magnitude which corresponds to the magnitude of the condition being sensed. Similarly with respect to the operating devices, the programmable controller must be capable of providing a variety of electrical output signals either DC, AC or analog current signals for driving the different types of operating devices on the controlled equipment. In order to provide a programmable controller capable of being interfaced to a wide variety of industrial equipment, modularized controllers have been developed which allow the use of different combinations of input and output modules depending upon the requirements of the specific industrial equipment being controlled.

As industrial processes became more complex, a more sophisticated sensing and control system was required. In many instances, the simple voltage or current inputs and outputs of the programmable controller were insufficient to communicate the data to and from the equipment. In many instances, more sophisticated sensors were devised to provide detailed data about the individual workpieces being handled by the controlled equipment. For example, automobile assembly lines use radio frequency transponder tags mounted either on the automobile or the assembly line carriage for the automobile. As the automobile passes a work station, a transceiver mounted on the work station interrogates the RF transponder tag to acquire data about the specific automobile being processed. Such data, for example, identifies the model of car as well as the options and features to be incorporated. Once the transceiver has interrogated the transponder tag, the data regarding the automobile is provided to a programmable controller at the work station over a serial communication link.

Various types of these sophisticated sensing and operating devices, manufactured by different companies and utilizing different communication protocols may have to be interfaced to the same programmable controller. Although these devices often use standard public-domain serial communication protocols, their manufacturers have also utilized proprietary protocols. In order to provide a programmable controller with the greatest degree of flexibility to connect a wide variety of sensing and operating devices, the programmable controller must be configurable to communicate using of a variety of serial protocols. In addition, a given programmable controller in a specific installation may have to communicate using a number of different protocols simultaneously.

A large assembly line may be controlled by a number of programmable controllers. In which case, a serial communication network interconnects the programmable controllers allowing them to exchange data regarding the operation of the assembly line. A host computer is often coupled to the network to receive assembly line status information from the programmable controllers and issue commands to them.

SUMMARY OF THE INVENTION

A module provides a serial communication interface for coupling input and output (I/O) devices and other remote apparatus to a programmable controller. The module contains a serial port circuit which has a processor that executes a program to supervise the exchange data between the programmable controller and the external devices. The exchange of data utilizes a defined serial communication protocol and the processor can execute different programs depending upon which protocol is being used. The port circuit also includes a memory for storing the program executed by the processor. In addition, signal drivers are provided to electrically couple the module to a communication link for the external devices.

The communication module further includes a connector into which a removable memory cartridge may be inserted. The memory cartridge provides non-volatile storage for a program that controls the processor. A mechanism is provided in the module to transfer the program from the memory cartridge to the memory in the port circuit. This enables the communication protocol to be changed by changing the memory cartridge and transferring a different program into the port circuit memory.

In the preferred embodiment, the communication module has a number of port circuits so that several serial communication links may be coupled to the module. Although this embodiment has particular applicability as a input module for a programmable controller, it may also be used in a stand-alone manner interconnecting the serial communication links for the exchange of data among the links. The same or different programs may be executed by each port circuit processor, thereby enabling communication with different protocols. In this case, several programs are stored in one memory cartridge or multiple memory cartridge connectors are provided. Configuration data is stored in the module indicating from which memory cartridge the program for each port circuit is to be transferred.

A communication protocol used by the communication module can require the user to select parameter options, such as baud rate, the length of the data characters, and the number of stop bits. The user is afforded the opportunity to configure the port circuit by selecting specific options. However, different protocols can have different parameters, which means that the port circuit configuration procedure is dependent upon the particular protocol being used. Therefore, a set of protocol parameter inquiries is stored in the memory cartridge along with the protocol program. These inquiries are transferred into the communication module and are used to query the user to select the specific protocol parameter options.

The general object of the present invention is to provide a serial communication module for a programmable controller, which can be configured to exchange data with external devices using one of several protocols.

Another object is to be able to configure the serial communication module with different protocol data stored in removable cartridges.

Yet another object of the present invention is to store configuration inquiries in the cartridges, which inquiries are employed to query the user to select the options to configure the communication protocol parameters.

DETAILED DESCRIPTION OF THE INVENTION

Figure 1:
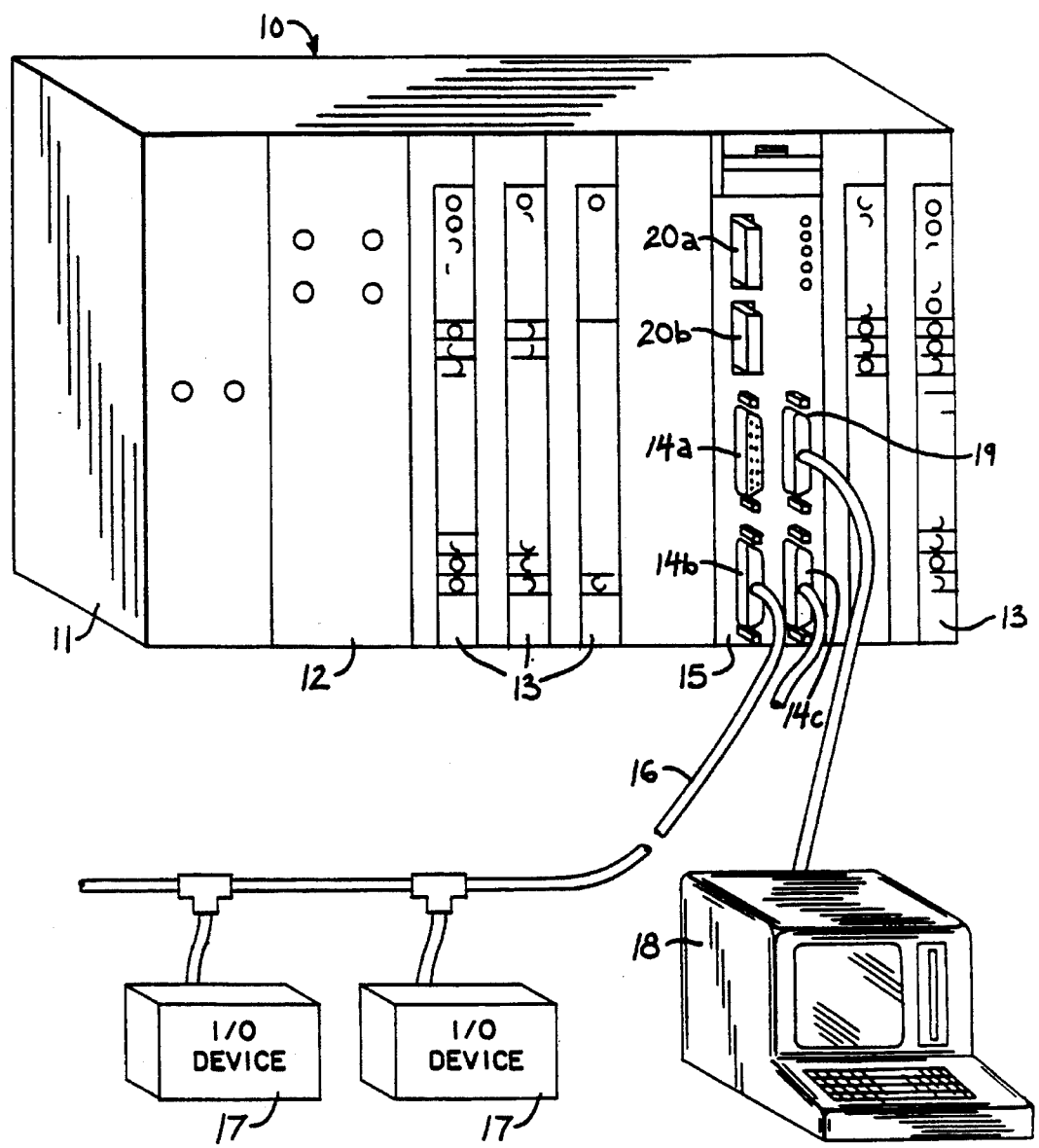
FIG. 1 is a pictorial representation of a programmable controller.

FIG. 1 illustrates a conventional programmable controller 10, such as an Allen-Bradley 1771 series system, which executes program instructions to operate a machine. The controller 10 includes a rack 11 in which a number of functional modules 12, 13 and 15 are housed and interconnected by a mother board within the rack. The rack 11 includes a power supply which provides electricity to each of the functional modules. A processor module 12 is provided to store and execute a user-defined control program to control the operation of the machine. Located elsewhere in the rack 11 are a number of input/output (I/O) modules 13 which interface the processor module 12 to sensing an operating device on the controlled machine.

One of the functional modules is an communication module 15 which exchanges data between sensing and operating devices via a serial communication link 16. Up to three such communication links can be simultaneously coupled to a trio of ports 14a–c on the serial communication module 15. As illustrated in FIG. 1, different types of I/O devices 17, such as a radio frequency tag transceiver, are coupled to the communication link 16 to exchange data with the programmable controller 10. A serial communication link to another programmable controller or a host computer (not shown) is connected to I/O port 14c. The communication module 15 also includes a configuration port 19 to which a programming terminal 18 is connected for configuring the module to perform specific tasks.

A unique feature of the serial communication module 15 is a pair of removable communication protocol cartridges 20a and 20b plugged into sockets through the front panel of the module. Each protocol cartridge stores two different communication protocol programs for the three I/O ports 14a–c of the module. The module can be reconfigured for a different set of communication protocols merely by changing the protocol cartridges. Since the sockets are located on the exposed front panel, the protocol cartridges may be replaced without disassembly of the module or its removal from the rack.

Figure 2:
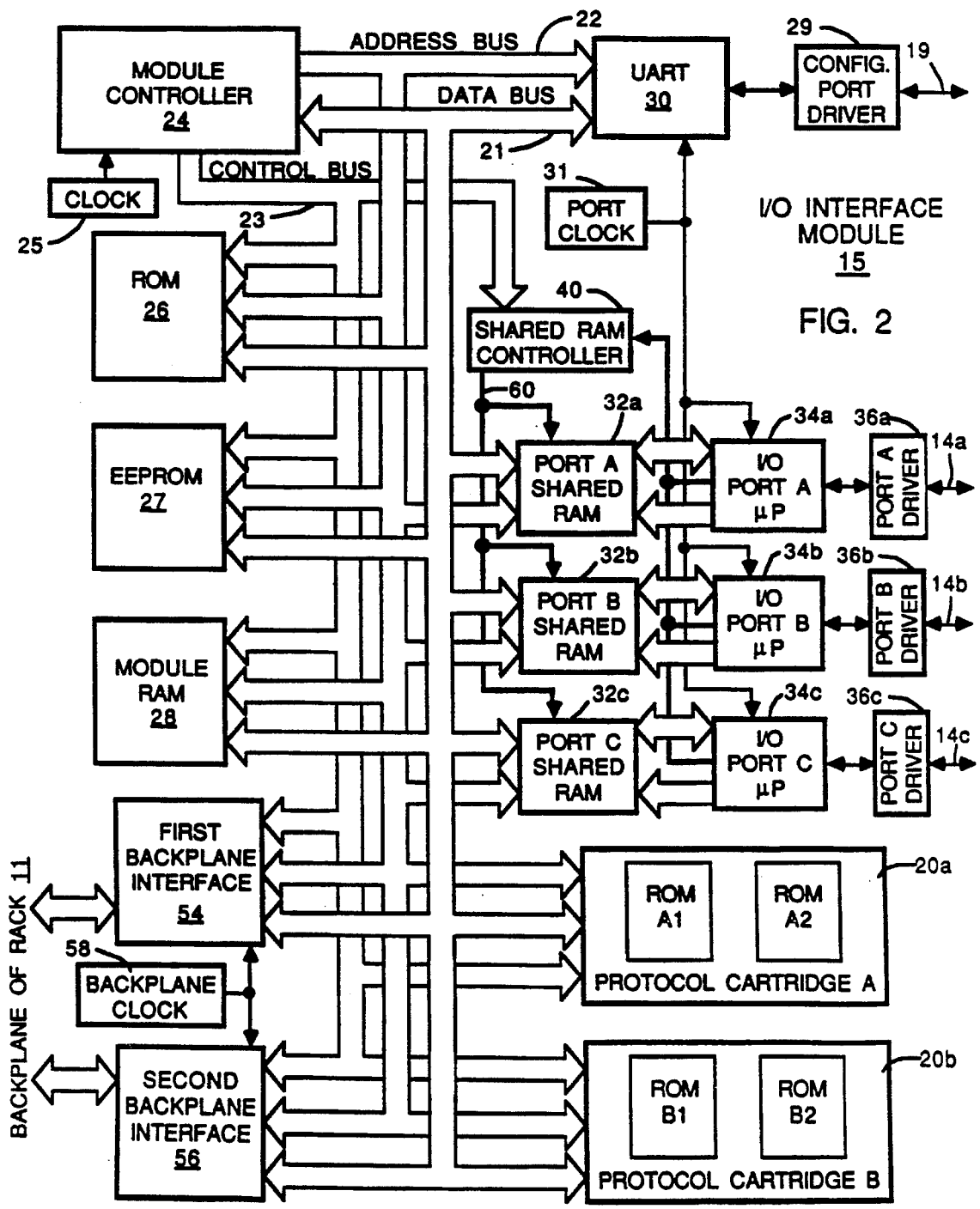
FIG. 2 is a block schematic diagram of a serial communication module incorporating the present invention.

FIG. 2 illustrates the components of the serial communication module 15. The module is built around a parallel data bus 21, a parallel address bus 22 and a set of control lines forming a control bus 23, all of which extend among the components of the module. Coupled to these buses 21–23 is a module controller 24 which governs the overall operation of the module and the exchange of data between the I/O ports 14a–c and the backplane of the rack 11. The module controller 24 may be an 80C188-10 model microcontroller manufactured by Intel Corp. which includes an internal memory, timers, counters, a system clock generator and a system bus controller in one integrated circuit package. The module controller 24 receives timing signals from a clock 25.

A read only memory (ROM) 26 stores a program for execution by the module controller 24 and an electrically erasable programmable read only memory (EEPROM) 27 stores configuration data provided to the module 15 via the programming terminal 18. Alternatively, this configuration data may be received by the communication module 15 across the rack backplane from the processor module 13 or a host computer coupled to the programmable controller 10. A module random access memory (RAM) 28 provides storage locations in which the module controller 24 retains different variables and intermediate processing results which are used in carrying out its control function. Other storage locations in the module RAM 28 are allocated to store data for other module components, as will be described.

As noted previously, the programming terminal 18 is connected to a configuration port 19 of the communication module 15 in order to supply configuration data defining the module's operation. The module controller 24 supervises the exchange of data via the configuration port using a communication protocol which is permanently programmed into the module and not user alterable. In order to exchange data, the configuration port 19 is coupled by a driver circuit 29 to a universal asynchronous receiver/transmitter (UART) 30. The UART is a conventional device which translates the serial data exchanged between the module and the programming terminal 18 into the parallel format of the data bus 21 and the internal components of the module. The UART 30 receives timing information from a port clock 31.

The module circuitry for each serial I/O port 14a–c includes a separate port microprocessor 34a–c, such as a 80C32 device manufactured by Siemens. This microprocessor type includes internal random access memory, UART, Limers and parallel I/O ports. The internal UART of each I/O port microprocessor 34a–b is coupled to a port connector on the front panel of the module 15 by a driver circuit 36a–c, respectively. The driver circuits interface the module's internal electrical signal levels to those which conform to several serial communication standards, such as RS-232, RS-422 and RS-485.

The I/O port circuit also includes a shared random access memory (RAM) 32a–c which couples the I/O port microprocessor 34a–c to the module data and address buses 21 and 22. Each of the shared random access memories 32a–b receives a timing signal from port clock 31 and control signals from a shared RAM controller 40, which is coupled to the module controller 24 via the control bus 23 and to the I/O port microprocessors 34a–c. Alternatively, dual-ported RAM's can be used instead of shared RAM circuitry.

Figure 3:
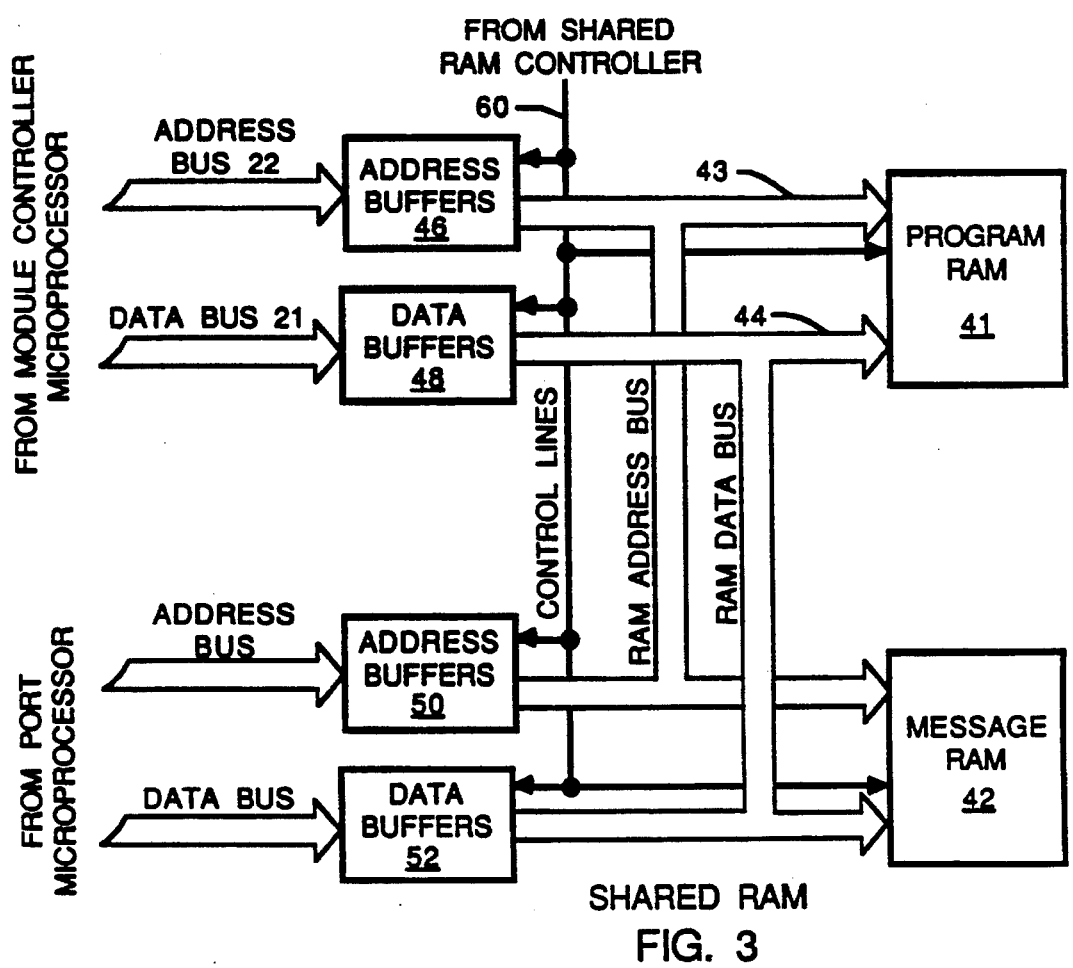
FIG. 3 is a block schematic diagram of a shared random access memory in the module.

The details for one of the port shared RAM's 32a–c are shown in FIG. 3. The shared RAM includes two separate memory devices designated as program RAM 41 and message RAM 42. The program RAM 41 stores the program for the associated I/O port microprocessor 34a–c, which program supervises communication via the port and inherently defines the communication protocol for that port. Hereinafter these programs are referred to as protocol programs. The message RAM 42 provides storage locations for the data being communicated via the corresponding serial I/O port. The two RAM's 41 and 42 are coupled to an internal RAM address bus 43 and a RAM data bus 44. A first set of address buffers 46 couple the lines of the RAM address bus 43 to the module address bus 22, and a first set of data buffers 48 couple the lines of the RAM data bus 44 to the module data bus 21. Similarly, a second set of address buffers 50 couple the RAM address bus 43 to the address lines from the associated port microprocessor 34a–c, and a second set of data buffers 52 couple the data lines from the associated port microprocessor to the RAM data bus 44. The sets of address and data buffers 46–52 receive separate enabling control signals from the shared RAM controller 40.

As described previously, two separate protocol cartridges 20a and 20b may be plugged into the serial communication module 15 to program the three I/O ports with a specific communication protocol, such as any of several standardized ones. As shown in FIG. 2, each protocol cartridge 20a and 20b has two read only memories (referred to herein as ROM's A1 and A2, or B1 and B2), within each of which is stored a separate program for execution by a port microprocessor to implement serial communication according to a different protocol. Each cartridge ROM A1, A2, B1 and B2 is coupled to the module data and address buses 21 and 22 and receives signals from control bus 23. The ROM's in the protocol cartridge 20a and 20b may be programmable read only memories into which the communication module manufacturer or the user has stored the protocol programs using conventional programming techniques and equipment. Such programs are similar to the programs used by previously available microprocessor based devices which control the serial communication of data over a network. As will be described, one of the protocol programs is executed by each active port microprocessor 34a–c.

The serial communication module 15 occupies two slots within rack 11 and couples to the rack backplane connectors for each of the two slots. Two backplane interface circuits 54 and 56 are connected to the module buses 21–23 to exchange data between the module 15 and other modules of the programmable controller rack 11. The backplane interface circuits 54 and 56 receive timing signals from a backplane clock 58. The backplane interface circuits 54 and 56 relieve the module controller 28 of many functions related to communication with the programmable controller processor module 12 or other modules 14 over the rack backplane 11. The backplane interface circuits 54 and 56 provide both discrete byte and data block transfer capability. Any of several well-known backplane interface circuits may be used, such as the one disclosed in U.S. Pat. No. 5,065,314.

From the above description of the circuitry for the serial communication module 15, it is apparent that the module utilizes several different memory devices. Some of these devices, such as the ROM 26, EEPROM 27 and module RAM 28 are accessible by only the module controller 24, whereas the shared RAM's 32a–c are accessible by either the module controller 24 or the associated I/O port microprocessor 34a–c.

Figure 4:
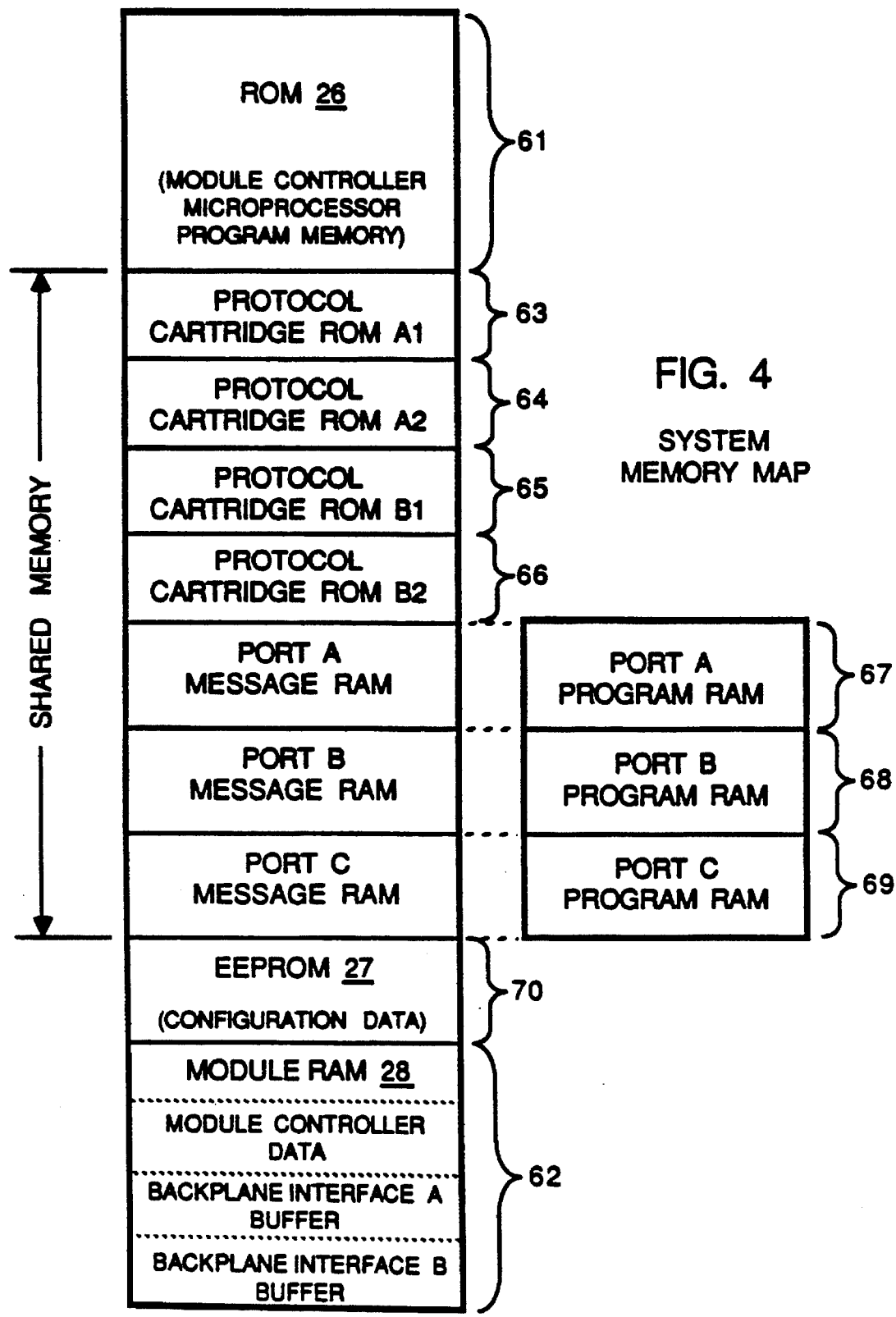
FIG. 4 is a memory map of the serial communication module storage locations.

FIG. 4 represents a memory map of all the memory devices in the serial communication module 15. A group of addresses 61 are assigned to the storage locations in ROM 26 which contain the program that is executed by the module controller 24. Another group of addresses 62 are assigned to the storage locations in module RAM 28, which is subdivided into sections for holding data for different components of the serial communication module 15. For example, one section is utilized to store constants, variables, intermediate processing results and other data for the module controller 24; while other sections act as buffers for data going to and from the backplane interfaces 54 and 56. Additional sections can be provided as buffers for data going to and from the shared RAM's 32a–c, if requiring the module controller 24 to wait for direct access to the RAM's adversely affects the processing. In this case, a background task can be used to transfer the data between the appropriate shared RAM 32a–c and the system RAM 28. Other blocks of addresses 63–66 have been assigned to ROM's A1, A2, B1 and B2 in the protocol cartridges 20a and 20b.

The shared RAM's 32a–c are accessed by the associated I/O port microprocessor 34a–c and by the module controller 24. However, the latter device only needs access to the program memory 41 in the shared RAM's during configuration of the I/O ports. Therefore, in order to conserve address space, the two components of the shared RAM (program RAM 41 and message RAM 42) for each port can be assigned the same block of addresses 67–69 as illustrated in FIG. 4. In order to select either the program RAM 41 or the message RAM 42, a signal on one of the control lines 60 from the shared RAM controller 40 is toggled.

A final group of addresses 70 are assigned to the EEPROM 27 to store system configuration data. This data defines module parameters, such as which ROM on which protocol cartridge contains the protocol program for each I/O port A, B and C and port specific parameters, such as baud and serial character length, etc. In addition, configuration data is stored in the EEPROM for the two backplane interfaces 54 and 56. A complete set of default parameters are stored in the EEPROM by the manufacturer. However, if these default parameters are not acceptable for the user's application (and they probably will not be acceptable), the user can alter the parameters via the terminal 18 connected to the configuration port 19.

The terminal presents the user with a menu of functions from which to choose. In order to redefine the protocols for an I/O port, the user initially would select the function to configure basic module parameters and identify which protocol cartridge ROM A1, A2, B1 or B2 contains the program for the port 14a–c being configured.

Figure 5:
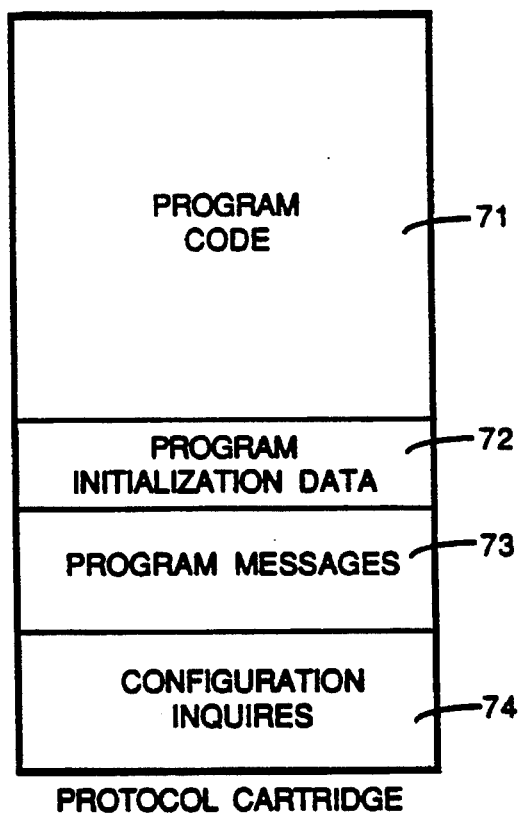
FIG. 5 is a memory map of the protocol cartridge memory.

When the user exits the basic module configuration function, the module controller 24 transfers the contents of the designated protocol cartridge ROM into other memory devices in the communication module 15. Each protocol cartridge ROM A1, A2, B1 and B2 is subdivided into sections for storing different types of data as depicted in FIG. 5. A sizeable portion 71 of each protocol cartridge ROM contains the program code for execution by the associated I/O port microprocessor 34a–c. Another block of memory locations 72 stores initialization data for the port program, while status messages which the port program displays on terminal 18 are stored in another section 73. The final section of the protocol cartridge ROM stores inquires, which are used to query the module user during configuration of the port parameters, as will be explained.

In transferring the contents of the protocol cartridges 20a and 20b, the module controller 24 reads blocks of data from the designated cartridge ROM for the I/O port by sequentially addressing protocol cartridge storage locations via address bus 22 to read data via bus 21. After reading a block of data, the module controller requests the shared RAM controller 40 for access to the shared RAM 32a–c of the appropriate port. When the access is granted, the program code, initialization data and program messages from the protocol cartridge RAM are stored in the program RAM 41 of the shared RAM. The configuration inquiries in section 74 of the protocol cartridge ROM are transferred into an area of the module RAM 28 designated for that data. The same type of transfer of data from the protocol cartridges 20a and 20b to each port shared RAM 32a–c occurs automatically upon power-up of the programmable controller 10.

After the transfer of the protocol cartridge data, the user may alter the configuration parameters of the particular I/O port. Since each serial communication protocol program stored in the cartridges 20a and 20b can have a different group of user variable parameters and options, the configuration inquiries to be displayed on the terminal are unique to that protocol and are stored in the cartridge 20a and 20b with the communication protocol program. As noted, these inquiries are now stored in module RAM 28. When the user chooses to alter a given I/O port's configuration parameters, the inquiries for that port are sequentially displayed on the terminal 18. Several inquiries may be used to define a given parameter. For example, to define the baud rate of the serial I/O port, a series of inquiries are used, each presenting one of the acceptable rates (e.g. 300, 1200, 2400, etc.) to the user. The user is asked to answer yes or no as to whether the choice displayed by a given inquiry is acceptable. The configuration routine loops through all of the inquiries for a given parameter until the user enters an affirmative response to one of the inquiries. The routine then advances to the first inquiry for the next parameter in the sequence.

Figure 6:
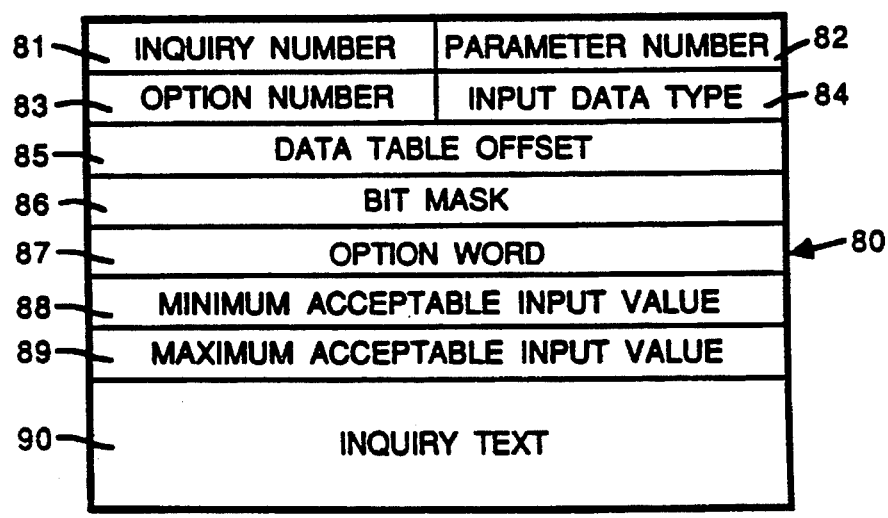
FIG. 6 depicts the data structure of one entry in the configuration inquires section of the protocol cartridge memory.

The structure of the data block 80 for one inquiry stored in module RAM 28 is depicted in FIG. 6. The stored inquiries are consecutively numbered and the first word of the data block has a byte 81 which contains that number. The other byte 82 of the first word indicates the number of the parameter to which the inquiry relates. As will be described, the inquiry and parameter numbers are used to sequentially access the inquiries. The second word in the inquiry data block 80 contains a byte 83 which identifies the number of the particular option for this inquiry. For example, if the parameter is the number of stop bits and the options are 1, 1.5 and 2, the inquiry for 2 stop bits is option number three. The other byte 84 of the second word designates the type of data which will be inputted and stored in response to this inquiry. For instance, the parameter may be stored as bit type data where combinations of one or more bits represent the different possible option selections, or the parameter may be a byte or word of data which stores a numerical parameter value entered by the user.

The third word 85 of the configuration inquiry contains an offset to the entry in the port configuration data table in EEPROM 27 which is to contain the response to the inquiry. The next field 86 stores a word with "ONES" in bit positions that correspond to bit positions used to encode the parameter in the data table word. This word 86 of the inquiry data block 80 is used as a mask to select only the bits of the field 86 which are used by the present parameter. For example, the selection of one of eight baud rates is indicated by three bits and the mask is used to insure that only the proper three bits of a data table entry are altered. If the parameter is represented by bit type data, the fifth data block entry 87 (designated "Option Word") contains the appropriate bit pattern in order to alter the port configuration data table word to indicate the selected parameter option. The bits of the Option Word which are not used to encode the parameter are zeroed.

If the user is to input a numerical value for the parameter, maximum and minimum acceptable values for the input are stored in entries 88 and 89 of the inquiry data block 80. The final section 90 of the data block 80 contains text which is displayed on the terminal for the inquiry.

Figure 7:
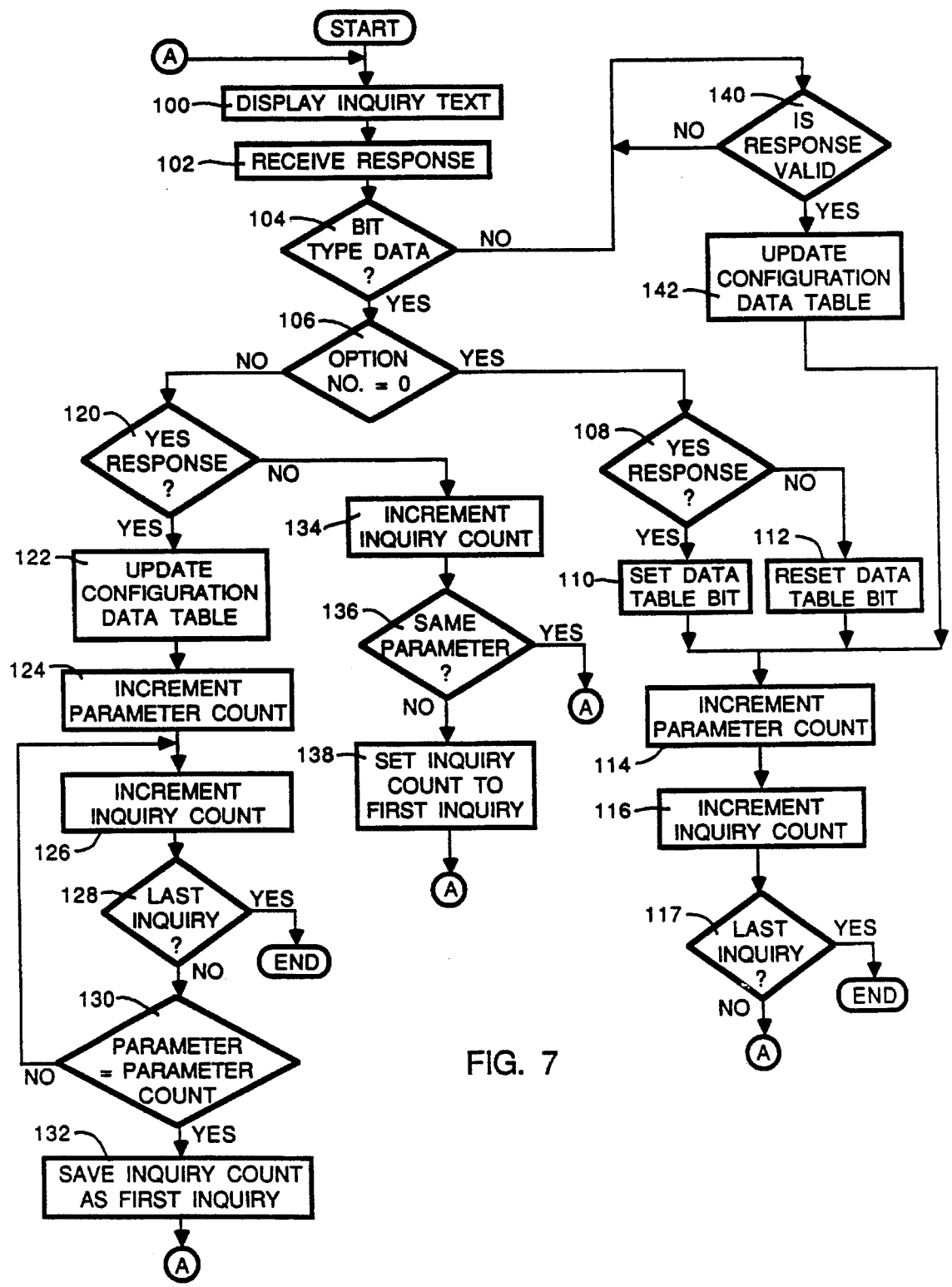
FIG. 7 is a flowchart of a routine which queries the user to select configuration parameter options for the ports of the serial communication module.

The file 74 of inquires is used by the port configuration software routine to query the user to select options for the serial communication parameters. The port configuration routine is depicted by the flowchart of FIG. 7. The process commences at step 100 by the module controller 24 obtaining the text for the first inquiry from the module RAM 28 and sending the text data through the configuration port 19 to terminal 18. Once the inquiry text is displayed on the terminal, the program execution waits at step 102 for a signal from UART 30 indicating that the user has entered a response via the terminal keyboard. When a response occurs, the module controller 24 obtains the response from UART 30 and examines the input data type field of the inquiry data block 80 at step 104. If the parameter will be stored as bit type data, the program execution advances to step 106.

Then, the option number in field 83 of the data block for the first inquiry is checked to determine if more than one option exists for the inquiry. The option number will be zero if only one inquiry is used to configure the current parameter. For example, if the parameter has only two possible values (e.g. enabled or disabled), a single inquiry can be used for inputting the parameter selection. In this case, the program execution branches to step 108.

At this point, since the user response to the inquiry is either yes or no, the module controller 24 determines whether an affirmative response has been received. If so, the port configuration Data Table Offset and Bit Mask fields 85 and 86 in the inquiry data block (FIG. 6) are employed at step 110 to set the bit for this parameter. Similarly, if a negative response was sent by the user, these inquiry data block entries are used to reset the bit at step 112. The altered byte or word of data is then stored in the port configuration data table in EEPROM 27.

Once the parameter selection has been recorded, the module controller 24 increments the contents of a memory location in module RAM 28, which stores a count of the parameters at step 114. This count indicates the current parameter being configured. Another memory location in module RAM 28 also is incremented at step 116 to indicate the number of the next inquiry. The new inquiry count is examined at step 117 to determine if the last inquiry has been processed, thereby indicating the completion of the port configuration task. If additional inquiries remain, the program execution returns to step 100 to display the text for the next inquiry.

If at step 106, a determination was made that the Option Number was not equal to zero, indicating multiple inquiries exist for the current parameter being configured, the program execution branches to step 120. For instance, if the parameter is baud rate, a separate inquiry would be provided for each of the acceptable baud rates (e.g. 300, 1200, 2400, 4800, etc.). At this step, the module controller 24 evaluates the user input for an affirmative response to the present inquiry. If an affirmative response has been entered, the program advances to step 122, where the selected parameter option is recorded in the port configuration data table in EEPROM 27.

Figure 8:
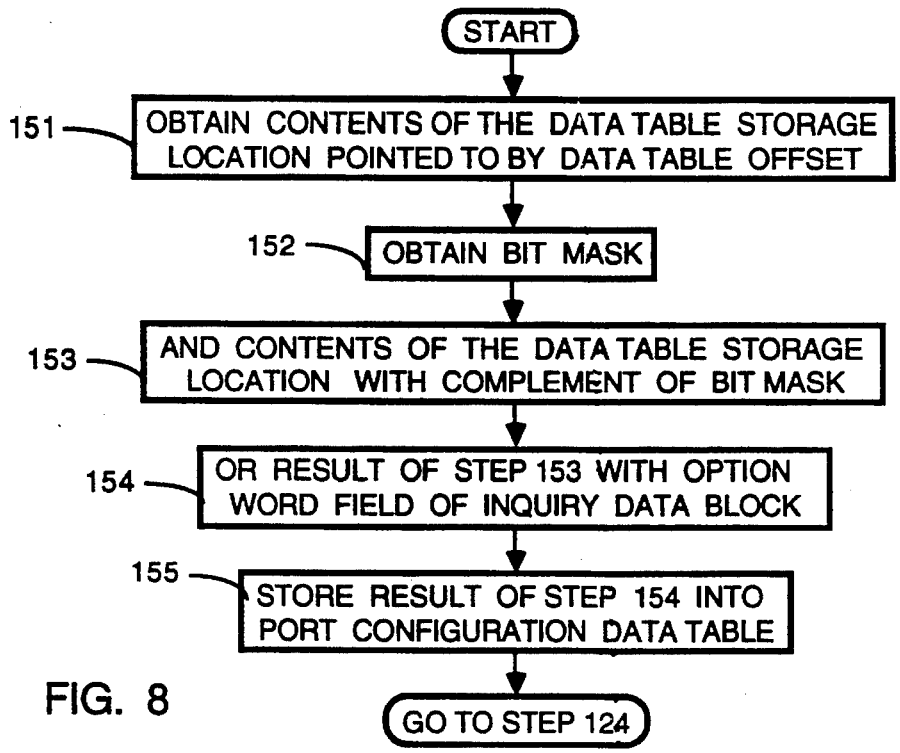
FIG. 8 depicts the operations performed at step 122 of FIG. 7.

To do so, the module controller 24 performs the steps shown in FIG. 8. The module controller 24 obtains the old contents of the data table storage location pointed to by the Data Table Offset 85 at step 154 and obtains the Bit Mask 86 from the inquiry data block at step 152. The old contents are AND'ed with the complement of the binary Bit Mask at step 153. This logical operation resets the bits for the parameter to zero while not affecting the bits in the data table entry which are used for other parameters. The result then is OR'ed with the Option Word field 87 of the inquiry data block 80 at step 154. As noted above, the Option Word consists of a word with a bit pattern to encode the inquiry response into the appropriate position in the configuration data table word. For example, if in response to the inquiry the parameter option selection should be recorded as "101" in the fourth through sixth bits of the data table word, the Bit Mask would be "0000000000111000" and the Option Word would contain the bit pattern "0000000000101000". At step 153, the final result of these logic operations is stored by the module controller into the port configuration data table EEPROM location pointed to by the Data Table Offset 85 in the inquiry data block 80.

Next at steps 124 and 126 on FIG. 7, the module controller 24 increments the parameter count and the inquiry count.

The new inquiry count is used at step 128 to determine if the configuration task is completed, in which case, the task ends. If additional inquiries remain, the Parameter Number 82 in the data block for the next inquiry is compared to the incremented parameter count. If the two parameter numbers are unequal, the program keeps incrementing the inquiry count and testing the parameter number for the new inquiry until the first inquiry for the next parameter is found. This looping would occur if the user selected the first option of a multiple option parameter, for example. When an inquiry for another parameter is found, the number of this inquiry is saved as the "First Inquiry" at step 132. The program execution returns to step 100, where the text for the first inquiry of the parameter is displayed on terminal 18 and the next parameter is configured.

When a negative response to an inquiry is detected at step 120, the program execution branches to step 134. In this case, another inquiry for the same parameter must be presented to the user. To do so, the module controller 24 increments the inquiry count at step 134 and tests the parameter number 82 in the data block of the new inquiry (see FIG. 6) at step 136. If the new inquiry is for the same parameter, the program jumps to step 100 to display its text. Otherwise, when the next inquiry is for a different parameter, the inquiry count is set to the value stored for the "First Inquiry" of the current parameter at step 138 before returning to step 100. Thus, the port configuration task cycles through all of the inquiries for a given parameter until an affirmative response is received to one of the inquiries.

If a parameter configuration requires the user to enter a numerical value for the parameter data, the byte or word of entered data has to be stored in the port configuration data table in EEPROM 27. In this case, the parameter is configured by a single inquiry which does not utilize bit type data. Therefore, after this type of inquiry has been displayed at step 100 and a user input is received at step 102, the program execution branches from step 104 to step 140. The module controller 24 compares the user's input to both the minimum and maximum acceptable values stored in fields 88 and 89 of the inquiry data block 80. If the input is unacceptable, the program loops until a valid response is received.

Figure 9:
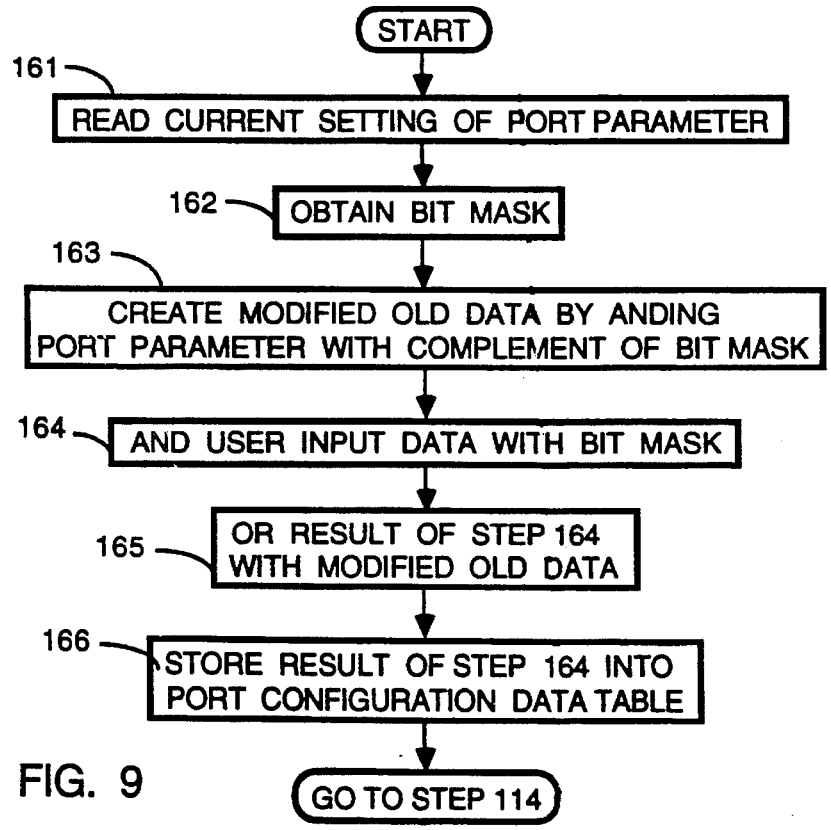
FIG. 9 depicts the operations performed at step 142 of FIG. 7.

When the response is within the acceptable range of values, the module controller 24 enters the response into the port configuration data table in EEPROM 27 at step 142. As shown in FIG. 9, this is accomplished by first reading the word of data which contains the current setting of the parameter from the port configuration data table in EEPROM 27 at step 161. The Data Table Offset 85 from the inquiry data block in module RAM 28 enables the module controller 24 to address the proper data table word. The Bit Mask for the inquiry is also obtained from field 86 of the inquiry data block 80 at step 162. The module controller 24 then AND's the old parameter data with the complement of the Bit Mask to reset only the bits for the present parameter at step 163. The result is a modified version of the old data. Then, the user's input data is AND'ed with the Bit Mask at step 164 and the result is OR'ed with the modified version of the old data at step 165. These logical operations insert the new parameter value into the port configuration data table entry. The module controller 24 uses the Data Table Offset in field 85 to access the port configuration data table in EEPROM 27 and store the revised parameter data in the proper storage location at step 166. The program execution then advances to step 14 on FIG. 7 where the parameter and inquiry counts are incremented and tested to obtain the inquiry for the next parameter.

In this manner, the port configuration inquiries from the protocol cartridge are used to select the parameters required by the specific communication protocol use by a given port. Similarly when another port is being configured, the unique set of inquiries from the cartridge ROM that contained its protocol program are employed to query the user for parameter selection.

We claim:

1. An interface module for coupling a serial communication link to a programmable controller in which data is transmitted over the communication link using a defined communication protocol, said interface module comprising:

means for connecting a communication link to said interface module:

a processor means for executing a program which controls the transfer of data between said interface module and the communication link according to the defined communication protocol;

a first memory means for storing the program and data for the processor means;

a memory cartridge that is removable without having to disassemble the interface module, said memory cartridge storing a program for said processor means which program defines the communication protocol;

means for electrically interconnecting said processor means, said first memory means, said means for connecting and said memory cartridge; and means for transferring the contents of said memory cartridge into said first memory means.

2. The interface module as recited in claim 1 wherein said memory cartridge also stores data defining inquiries to be presented to a user of the programmable controller in order to configure parameters of the communication protocol.

3. The interface module as recited in claim 2 wherein the data defining inquiries includes an inquiry identification number, a parameter number, a data table pointer, maximum and minimum acceptable values for the parameter, and text of the inquiry.

4. The interface module as recited in claim 2 wherein the data defining inquiries includes an inquiry identification number, a parameter number, a data table pointer, a bit mask for a data table entry, data encoding the parameter, and text of the inquiry.

5. The interface module as recited in claim 2 further comprising:
   means for presenting inquiries to the user, utilizing the data defining inquiries;
   means for receiving replies from the user to the inquiries; and
   a second memory means for storing a data table containing data indicative of the replies received from the user.

6. The interface module as recited in claim 5 wherein the data defining inquiries includes an inquiry identification number, a parameter number, a data table pointer, and text of the inquiry; and wherein said means for presenting repeatedly presents the inquiries for a given parameter to the user until an affirmative reply to one of the inquiries is received, before presenting an inquiry for another parameter.

7. The interface module as recited in claim 2 wherein the data defining inquiries includes a data table pointer, a bit mask, and data encoding the parameter; and further comprising:
   means, responsive to a reply from the user, for logically ANDing data previously stored in said second memory means at a location indicated by the data table pointer with data derived from the bit mask, and then logically ORing the result of the logical ANDing with the data encoding the parameter; and
   means for loading the result of the logic operations into said second memory means at the location indicated by the data table pointer.

8. An interface module for interconnecting a plurality of serial communication links for the exchange of data among the communication links, said interface module comprising:
   a plurality of port circuits, each of which coupling one of the serial communication links to the interface module and including:
      a) a processor means for executing a communication program which controls the transmitting and/or receiving of data over a serial communication link according to a given protocol,
      b) a first memory means for storing the communication program,
      c) means for coupling the serial communication link to said processor means, and
      d) means for interconnecting said processor means, said first memory means and said means for coupling;
   a removable memory cartridge means which contains a plurality of communication programs for said processor means;
   means for storing configuration data defining which of the plurality of communication programs in the memory cartridge means is to be stored in said first memory means of each port circuit; and
   means for transferring a communication program from said memory cartridge into said first memory means of each port circuit in response to the configuration data.

9. The interface module as recited in claim 8 for use in a programmable controller having a processor module and a number of functional modules located in a rack which electrically interconnects the processor and functional modules; and said interface module further comprising means for interfacing the port circuits to the rack for transferring data between the processor module and the port circuits.

10. The interface module as recited in claim 8 wherein said memory cartridge means also contains data defining inquiries to be presented to a user of said interface module in order to define parameters for the operation of each of said port circuits.

11. The interface module as recited in claim 10 further comprising:
    means for presenting inquiries to the user, utilizing the data defining inquiries;
    means for receiving replies from the user to the inquiries; and
    a second memory means for storing data indicative of the responses received from the user.

12. The interface module as recited in claim 11 wherein the data defining inquiries includes an inquiry identification number, a parameter number, a data table pointer, and text of the inquiry; and wherein said means for presenting inquiries repeatedly presents the inquiries for a given parameter to the user until an affirmative reply to one of the inquiries is received, before presenting an inquiry for another parameter.

13. The interface module as recited in claim 11 wherein the data defining inquiries includes a data table pointer, a bit mask, and data encoding the parameter; and further comprising:
    means responsive to a reply from the user for logically ANDing data previously stored in said second memory means at a location indicated by the data table pointer with data derived from the bit mask, and then logically ORing the result of the logical ANDing with the data encoding the parameter; and
    means for loading the result of the logic operations into said second memory means at the location indicated by the data table pointer.

14. The interface module as recited in claim 10 wherein the data defining inquiries includes an inquiry identification number, a parameter number, a data table pointer, a bit mask for a data table entry, data encoding the parameter, maximum and minimum acceptable values for the parameter, and text of the inquiry.

15. In a programmable controller having a processor module and a number of functional modules located in a rack and electrically interconnected by a backplane of the rack; a serial communication module for interfacing the programmable controller to a plurality of serial communication links, said serial communication module comprising:
    a plurality of separate port circuits for coupling a different one of the communication links to the communication module, each of said port circuits including:
       a) a port processor means for executing a communication program which controls the transmitting and/or receiving of data over the serial communication link according to a given protocol,
       b) first memory means for storing the communication program,
       c) means coupling the serial communication link to said port processor means, and
       d) means for interconnecting said processor means, said first memory means and said means for coupling;

a removable memory cartridge means which contains a plurality of communication programs executable by said port processor means; means for storing configuration data defining which program in the memory cartridge means is to be stored in said first memory means of each of said port circuits;

means for transferring a communication program from said memory cartridge means into said first memory means of a given port circuit in response to the configuration data;

means for coupling the serial communication module to the rack backplane; and a module processor means for controlling the transfer of data between said port circuits and the rack backplane.

16. The serial communication module as recited in claim 15 wherein said memory cartridge means also contains data defining inquiries to be presented to a user of the programmable controller in order to configure the operation of a port circuit for the given protocol.

17. The serial communication module as recited in claim 16 further comprising:

means for presenting inquiries to the user utilizing the data defining inquiries;

means for receiving responses to the inquiries from the user; and a third memory means for storing data indicative of the responses received from the user.

18. The serial communication module as recited in claim 15 wherein said module processor means executes a program to control the transfer of data; and said serial communication module further comprises a second memory means for storing the program for said module processor means.

19. The interface module as recited in claim 2 wherein the data defining inquiries includes a data table pointer, a bit mask, and maximum and minimum acceptable values for the parameter,; and further comprising:

means for determining whether a numerical reply from the user is within an acceptable range of values as designated by the maximum and minimum acceptable values for a selected parameter;

means responsive to said means for determining for logically ANDing data previously stored in said second memory means at a location indicated by the data table pointer with data derived from the bit mask to produce modified data, ANDing the numerical reply with the bit mask to produce a modified reply, and the logically ORing the modified data with the modified reply; and means for loading the result of the logic operations into said second memory means at the location indicated by the data table pointer.

20. The interface module as recited in claim 14 further comprising:

means for determining whether a numerical replay from the user is within an acceptable range of values as designated by the maximum and minimum acceptable values for a selected parameter;

means responsive to said means for determining for logically ANDing data previously stored in said second memory means at a location indicated by the data table pointer with data derived from the bit mask to produce modified data, ANDing the numerical replay with the bit mask to produce a modified replay, and then logically ORing the modified data with the modified replay; and means for loading the result of the logic operations into said second memory means at the location indicated by the data table pointer.

* * * * *

UNITED STATES PATENT AND TRADEMARK OFFICE
CERTIFICATE OF CORRECTION

PATENT NO. : 5,485,590
DATED : January 16, 1996
INVENTOR(S) : Hyatt et al.

It is certified that error appears in the above-indentified patent and that said Letters Patent is hereby corrected as shown below:

Col. 4, line 61         "Limers" should be --Timers--.

Col. 10, line 33        "step 14" should be ----step 114--.

Signed and Sealed this

Eleventh Day of June, 1996

Attest:

BRUCE LEHMAN

*Attesting Officer*          *Commissioner of Patents and Trademarks*